United States Patent

Monk

[15] 3,656,297
[45] Apr. 18, 1972

[54] COMBUSTION CHAMBER AIR INLET
[72] Inventor: Jeffrey Keith Monk, Belper, England
[73] Assignee: Rolls Royce Limited, Derby, England
[22] Filed: Aug. 28, 1970
[21] Appl. No.: 67,959

[30] Foreign Application Priority Data

Sept. 4, 1969  Great Britain ..................... 43,934/69

[52] U.S. Cl. ........................... 60/39.23, 60/39.29, 60/39.65
[51] Int. Cl. ....................................................... F02c 9/14
[58] Field of Search ............... 60/39.29, 39.23, 39.31, 39.65, 60/39.73

[56] References Cited

UNITED STATES PATENTS

| | | | |
|---|---|---|---|
| 2,829,494 | 4/1958 | Christensen | 60/39.65 X |
| 2,621,477 | 12/1952 | Powter | 60/39.23 |
| 2,973,624 | 3/1961 | Pierce | 60/39.65 |
| 3,088,279 | 5/1963 | Diedrich | 60/39.65 X |
| 3,290,880 | 12/1966 | Poyser | 60/39.65 |
| 3,545,202 | 12/1970 | Balt | 60/39.65 |

Primary Examiner—Clarence R. Gordon
Attorney—Cushman, Darby & Cushman

[57] ABSTRACT

An air inlet for a combustion chamber of a gas turbine engine comprises a duct extending into the combustion chamber, the duct having on its innermost end an inwardly directed lip and a plurality of apertures in the wall of the duct adjacent said end. Apertures may also be provided in the junction between the duct and the lip and the end of the inlet having the lip may be inclined at an acute angle to the axis of the combustion chamber.

5 Claims, 2 Drawing Figures

COMBUSTION CHAMBER AIR INLET

The present invention relates to combustion apparatus and more particularly to the air inlets of combustion chambers for use in gas turbine engines.

The present invention provides an air inlet for a combustion chamber, the inlet consisting of a duct having an inwardly directed lip adjacent one end of the duct, a plurality of apertures being formed in the wall of the duct adjacent said end.

The wall of the lip may be parallel to the wall of the duct and the apertures may be equi-spaced and arranged in series of parallel rows. A row of holes may be formed in the junction between the duct and the lip. The end of the inlet in which the lip is formed may be inclined at an acute angle to the axis of the duct. The lip can be formed integrally with the duct although it may be formed as a separate part.

Figure 1:
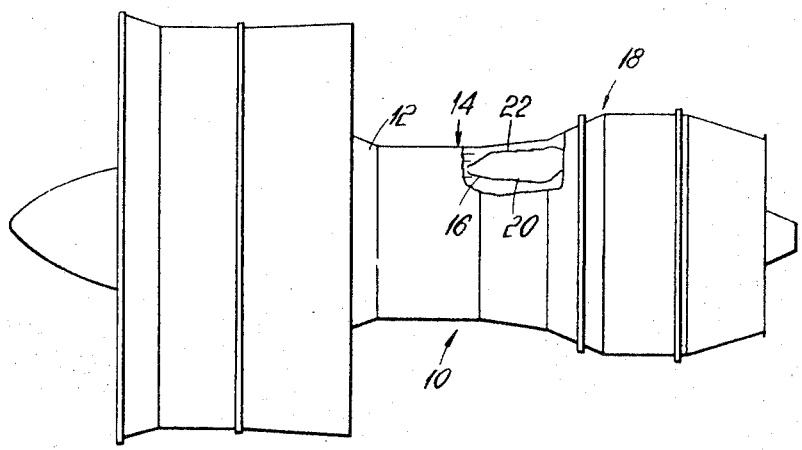
Figure 2:
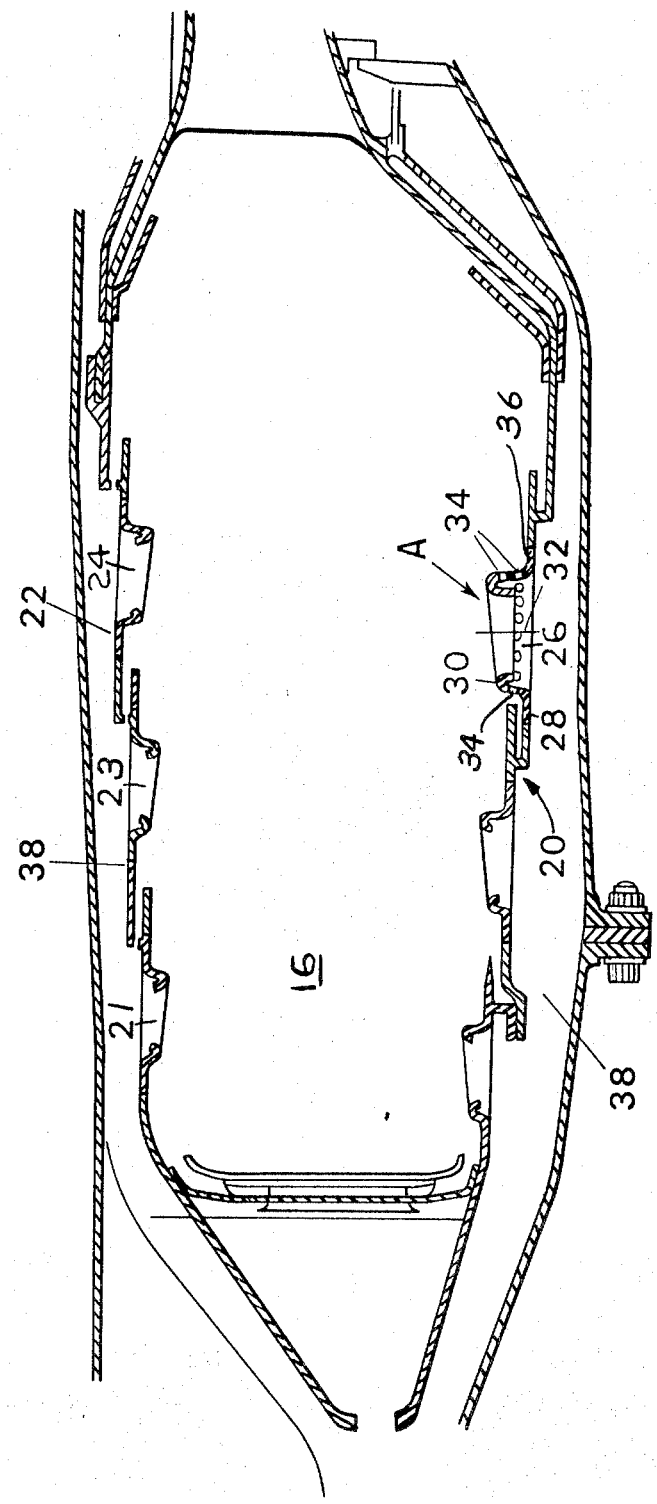

The inlet may either be formed integrally in a combustion chamber or as a separate member which can be joined to the combustion chamber by welding, for example:

The present invention will now be more particularly described with reference to the accompanying drawing in which, FIG. 1 shows a partially broken away elevation of a gas turbine engine and FIG. 2 shows a portion of one of the combustion chambers shown in FIG. 1 which incorporates a number of air inlets according to the present invention.

Referring to the Figs. a gas turbine engine 10 includes in flow series, compressor means 12, combustion means 14 which has an annular combustion chamber 16 and turbine means 18. The combustion chamber 16 has inner and outer walls 20 and 22 respectively which are formed with three rows of equi-spaced air inlets 21, 23 and 24 extending into the chamber 16. The inlets 21 are for the supply of primary air into the chamber 16 where it is mixed with fuel and burnt whilst the inlets 23 and 24 are for the supply of secondary and tertiary air which dilutes and cools the products of combustion.

Apart from the inlet marked 'A' which is shown in detail the remaining inlets are only shown diagrammatically.

The inlet marked 'A' which acts as a dilution chute consists of a duct portion 26 having a flange 28 at one end and an inwardly directed lip 30 formed integrally and parallel with the duct at the other end. The end of the inlet formed with the lip 30 is inclined at an acute angle to the axis 32 of the duct portion and is directed towards the downstream end of the chamber. The wall of the duct portion is formed with a number of parallel rows of equi-spaced apertures 34 and a row of apertures is formed in the junction between the duct 26 and the lip 30. Only a single complete row of apertures 34 are shown in FIG. 2 for reasons of clarity. An additional aperture 34 is shown above the visible row to indicate that a plurality of rows exist and at least one of these rows appears in the junction between duct 26 and lip 30. The inlets are welded into holes 36 by means of the flanges 28 although the inlets may be formed integrally by flanging plain holes in the walls 20, 22 and turning over the ends of the flanges to form a lip on each inlet.

In operation, air passes along passages 38 around the outside of the combustion chamber and flow into the chamber through the inlets 23 and 24 to mix with the already burnt mixture of fuel and air. A major portion of the dilution air passes out of each inlet directly into the combustion whilst the remainder of the air passes under the lip 30 and into the combustion chamber through the apertures 34. The air filtering out through the apertures 34 acts as a cooling blanket surrounding the inlet and prevents the inlets from becoming excessively heated and eroded by the high temperature gases produced in the combustion chamber.

Whilst the invention has been described with reference to an annular combustion chamber it can equally well be applied both to the can and tubo-annular types of combustion chamber and an inlet or inlets according to the invention may be located at any convenient point in a combustion chamber wall for the inlet of primary air and/or dilution air.

I claim:

1. An air inlet for a gas turbine engine combustion chamber, said inlet comprising a duct formed by a wall extending into said combustion chamber and having an inner end within said combustion chamber and a lip adjacent said inner end of said duct formed by a wall which is substantially parallel to the wall of said duct, said lip being directed into said duct and towards the outer end of said duct, said duct further including a plurality of apertures formed in the duct wall in at least two parallel rows around said duct adjacent the inner end thereof whereby said lip forces a portion of the fluid entering said duct from outside said combustion chamber to filter out through said apertures and provide a cooling blanket substantially surrounding said inlet.

2. An air inlet for a gas turbine engine combustion chamber as recited in claim 1 wherein one row of said apertures is formed in the junction between said duct and said lip.

3. An air inlet for a gas turbine engine as recited in claim 1 wherein said lip and said duct comprise a single integral unit.

4. An air inlet for a gas turbine engine as recited in claim 3 wherein said lip is disposed at an inclined angle to the axis of said duct.

5. An air inlet for a gas turbine engine as recited in claim 1 wherein said lip is disposed at an inclined angle to the axis of said duct.

* * * * *